Patented Dec. 10, 1940

2,224,498

UNITED STATES PATENT OFFICE 2,224,498

CAST REFRACTORY WITH ADEQUATE POROSITY

Bunpei Yoshiki, Tokyo, Japan, assignor to Corning Glass Works, Corning, N. Y., a corporation of New York No Drawing. Application September 9, 1937, Serial No. 163,160. In Japan November 9, 1936

1 Claim. (Cl. 106—9)

It is the object of this invention to produce an electrocast refractory having but slight tendency to spall, and embodying a minimum percentage of glass, substantially consisting of crystals of spinel and forsterite.

I have discovered that such a refractory can be produced by melting a proper batch in an electric furnace and casting the molten mass resulting therefrom, and it is in this sense that I use the term "electrocast refractory."

The batch is one containing magnesia and aluminous clay of such composition and in such proportions that the melt resulting therefrom contains alumina, magnesia and silica in substantially the quantities answering to the quantities of such oxides present in $x$ percent of spinel and 100-$x$ percent of forsterite.

As an example a melt composed of 40% of magnesia, 40% of alumina and 20% of silica corresponds closely to the percentages of these ingredients present when the cast and cooled block is composed of about 56% of spinel crystals and 44% of forsterite crystals. In a like manner a melt consisting of 50% magnesia, 20% alumina and 30% silica corresponds to about 28% spinel and 72% forsterite.

The batch may be prepared from calcined magnesite and calcined aluminous clays, and it is important that it be free from glass forming alkali oxides in substantial quantities if the product is to contain the smallest percentage of glass.

If the batch materials are of this character the cast product will contain numerous microscopic cavities of air holes between crystals but will be free from the large pipe generally found in the center of cast refractories. Probably because of this porous structure, such castings are found much more resistant to spalling than ordinary electro-castings with crystals firmly held together with glassy matrix.

Having thus described my invention what I claim and desire to secure by Letters Patent is:

A cast refractory substantially consisting of crystals of spinel and forsterite and analytically containing between 40 and 20 per cent of alumina and between 20 and 30 per cent of silica, the balance being magnesia.

BUNPEI YOSHIKI.